United States Patent [19]

Tasset

[11] Patent Number: 4,800,186

[45] Date of Patent: Jan. 24, 1989

[54] REGENERATION OF FLUOROCARBONSULFONIC ACID CATALYSTS

[75] Inventor: Emmett L. Tasset, Lake Jackson, Tex.

[73] Assignee: The Dow Chemical Company, Midland, Mich.

[21] Appl. No.: 114,323

[22] Filed: Oct. 28, 1987

[51] Int. Cl.$^4$ .......... B01J 31/40; B01J 49/00; B01J 38/52; C07C 43/11
[52] U.S. Cl. .......... 502/33; 502/29; 502/31; 502/32; 568/607; 568/628; 585/458
[58] Field of Search .......... 502/33, 24, 31, 32, 502/11, 159

[56] References Cited

U.S. PATENT DOCUMENTS

| | | | |
|---|---|---|---|
| 4,038,213 | 7/1977 | McClure | 502/159 |
| 4,188,308 | 2/1980 | Vaughan | 502/27 |
| 4,303,551 | 12/1981 | Vaughan | 502/159 |
| 4,316,997 | 2/1982 | Vaughan | 585/45 F |

FOREIGN PATENT DOCUMENTS 187042 11/1982 Japan .

*Primary Examiner*—Paul E. Konopka
*Attorney, Agent, or Firm*—A. Cooper Ancona

[57] ABSTRACT

A method of regenerating a deactivated fluorocarbonsulfonic acid polymer catalyst by contacting the deactivated catalyst with a solvent combination wherein a first solvent swells the structure of the polymer and the other acts as a diluent to modify the swelling action of the first. The combination dissolves the deactivating components.

8 Claims, No Drawings

REGENERATION OF FLUOROCARBONSULFONIC ACID CATALYSTS

BACKGROUND OF THE INVENTION

Fluorocarbonsulfonic acid (FCSA) polymers have been found to be useful catalysts for a variety of acid-catalyzed reactions. Thus, such catalysts are useful for alkylating aliphatic or aromatic compounds, for decomposing organic peroxides, for sulfonating or nitrating organic compoounds and for oxyalkylating organic hydroxyl compounds. Such catalysts, their preparation and use are described in U.S. Pat. Nos. 4,038,213 and 4,303,551.

After being used for varying periods of time, however, these catalysts can become deactivated due to coking, but can be treated with strong acids to regenerate their activity. For example, in U.S. Pat. No. 4,188,308, 70% $HNO_3$ in water was used for reactivating such a catalyst after use in a hydrocarbon conversion process. In some processes, however, it is not desirable to introduce strong acids into the system.

It would be desirable to provide a regeneration process which would bring such deactivated catalysts back to their original efficacy without the use of strong acids. The present invention is directed to the regeneration of such catalysts without the use of a strong acid.

SUMMARY OF THE INVENTION

Fluorocarbonsulfonic acid polymer catalysts which have become deactivated can be restored to their original activity by treating with a combination of solvents which swells the fluorocarbonsulfonic acid polymer to a limited extent and dissolves the deactivating components, e.g. the combination of 2-butanol and an aromatic epoxide such as diphenyl oxide.

DETAILED DESCRIPTION OF THE INVENTION

The invention is a process for reactivating a spent, or deactivated fluorocarbonsulfonic acid catalyst. Such a catalyst which had been used in the reaction of tetrapropylene with diphenyl oxide and which had become deactivated was treated according to the reactivation process of the invention.

The process of regeneration is accomplished by treating the spent catalyst with a combination of solvents, one of which swells the structure of the polymer, but not enough to destroy it, while the other dilutes this effect and at the same time helps dissolve the components which have deposited on the active sites, thereby reactivating the catalyst.

Certain solvents have been found to swell the polymer structure of the catalyst, but, used undiluted, swell it to the point of disrupting and destroying the polymer structure. Such solvents include 2-butanol, cyclohexanol and dimethyl sulfoxide (DMSO).

Other solvents have been found to have a diluent effect on the above solvents and also help dissolve the components which deactivate the catalyst. These solvents include ethers, ketones, hydrocarbons and chlorinated hydrocarbons e.g. diphenyloxide(DPO), diethyl ether, methyl ethyl ketone (MEK), heptane, methylene chloride and 1,2-dichlorotetrafluoroethane.

Operable ratios of some preferred combinations are from about 5 to about 40% of the swelling solvent, namely DMSO, 2-butanol or cyclohexanol with the diluent co-solvent, DPO, making up the balance, i.e. 60 to 95%. Preferred ratios are from about 10 to about 30 percent of the swelling solvent and from about 90 to about 70 percent of the co-solvent.

The treatment is conducted by heating the solvent mixture and contacting the deactivated resin with it at a temperature within the range of from about 40° to about 100° C., preferably from about 50° to about 70° C.

The following example illustrates the operation of the process of the invention:

EXAMPLE 1

An FCSA catalyst* (6.25% by weight in the reaction mixture) was used in the alkylation reaction of tetrapropylene (TTP) with DPO (mole ratio TTP/DPO=10:1)** at 150° C., providing 65% conversion of tetrapropylene. After eight days the catalyst had become deactivated to the extent that only a 36 percent conversion of the tetrapropylene was obtained in one hour in the reaction with DPO (1:3 mole ratio of TTP/DPO).

*An alumina-supported catalyst, containing 13.4% polymer, which is described in my copending U.S. application Ser. No. 947,788, filed Dec. 30, 1986, which is incorporated herein by reference.

**Although the normal operating conditions employ ratios in which there is an excess of DPO, the excess of TTP was used in order to deactivate the catalyst more rapidly for the purposes of the experiment of reactivating the spent catalyst.

Before reactivating and before using the catalyst in the alkylation reaction it was washed with hexane and dried for one hour under vacuum at 110° C.

This catalyst was regenerated by placing it in a mixture of 10% 2-butanol/90% diphenyl oxide and heated at a temperature of 50° C. for a period of 15 hours and then retested in the above reaction using the 1:3 ratio of reactants. The conversion was the same as that of the new catalyst when first employed.

I claim:

1. A process for regenerating a fluorocarbon-sulfonic acid polymer catalyst which has been deactivated due to coking in an alkylation process, which comprises contacting the deactivated catalyst with heating to a temperature of from about 40° to about 100° C. for a period of time sufficient to restore the activity of said catalyst with a solvent combination of (1) at least one solvent which swells the structure of the polymer and (2) diphenyloxide as a diluent solvent to dissolve the deactivating components and reactivate the catalyst and wherein the swelling solvent is present in the solvent mixture in an amount of from about 5 to about 40 percent, the remainder being diphenyl oxide.

2. The process of claim 1 wherein swelling solvent (1) is selected from 2-butanol and dimethyl sulfoxide.

3. The process of claim 1 wherein the treatment is conducted by heating to a temperature within the range of from about 50° to about 70° C.

4. The process of claim 1 wherein the swelling solvent (1) is present in an amount of from about 10 to about 30 percent of the solvent mixture.

5. The process of claim 4 wherein the swelling solvent (1) is 2-butanol.

6. The process of claim 5 wherein the solvent composition contains 10 percent 2-butanol and 90 percent diphenyl oxide.

7. The process of claim 4 wherein the swelling solvent (1) is dimethyl sulfoxide.

8. The process of claim 7 wherein the solvent composition contains 15 percent dimethyl sulfoxide and 85% diphenyl oxide.

* * * * *